Oct. 18, 1932.  H. A. DOUGLAS  1,883,625
SWITCHING MECHANISM
Filed Feb. 18, 1932   2 Sheets-Sheet 1
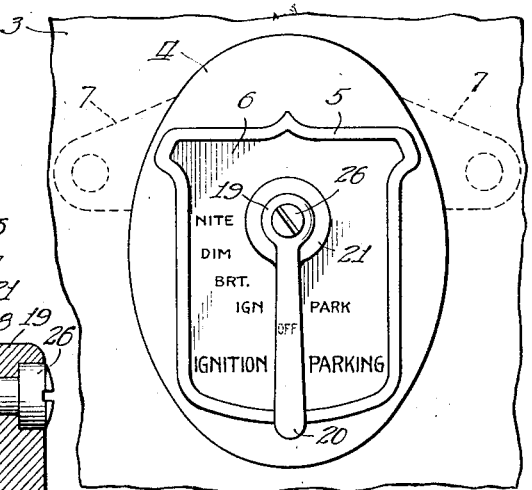
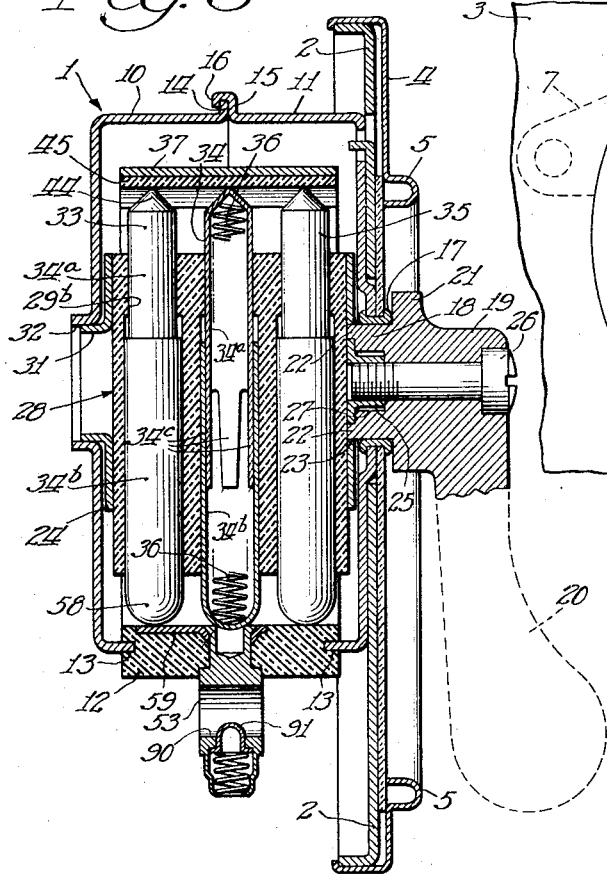
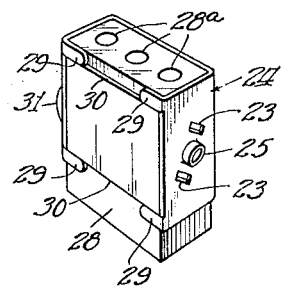
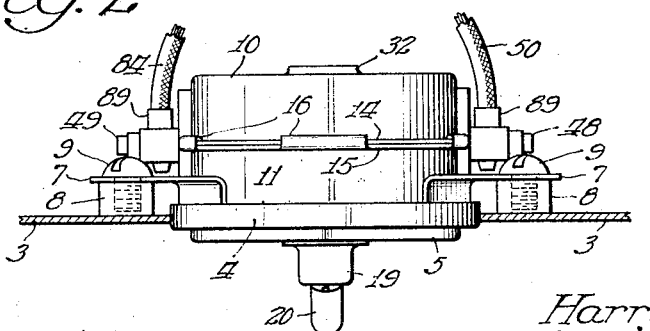
Inventor
Harry A. Douglas
By Langdon Moore
Atty.

Oct. 18, 1932.                 H. A. DOUGLAS                    1,883,625
                             SWITCHING MECHANISM
                    Filed Feb. 18, 1932        2 Sheets-Sheet 2
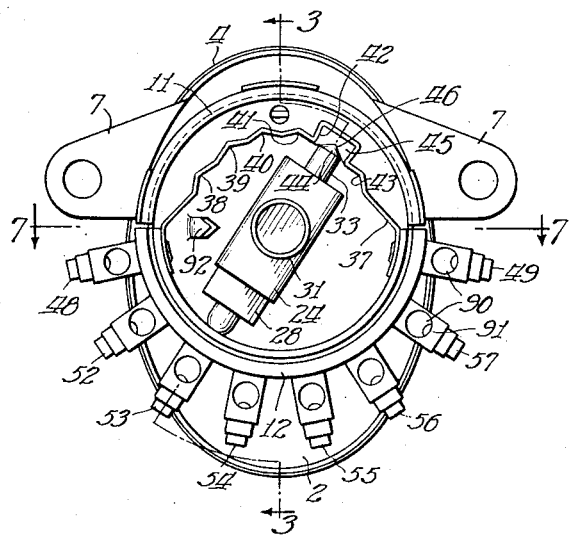
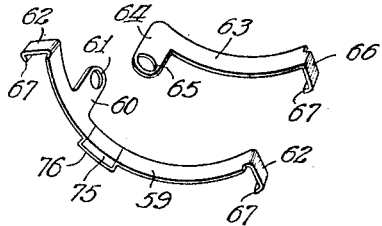
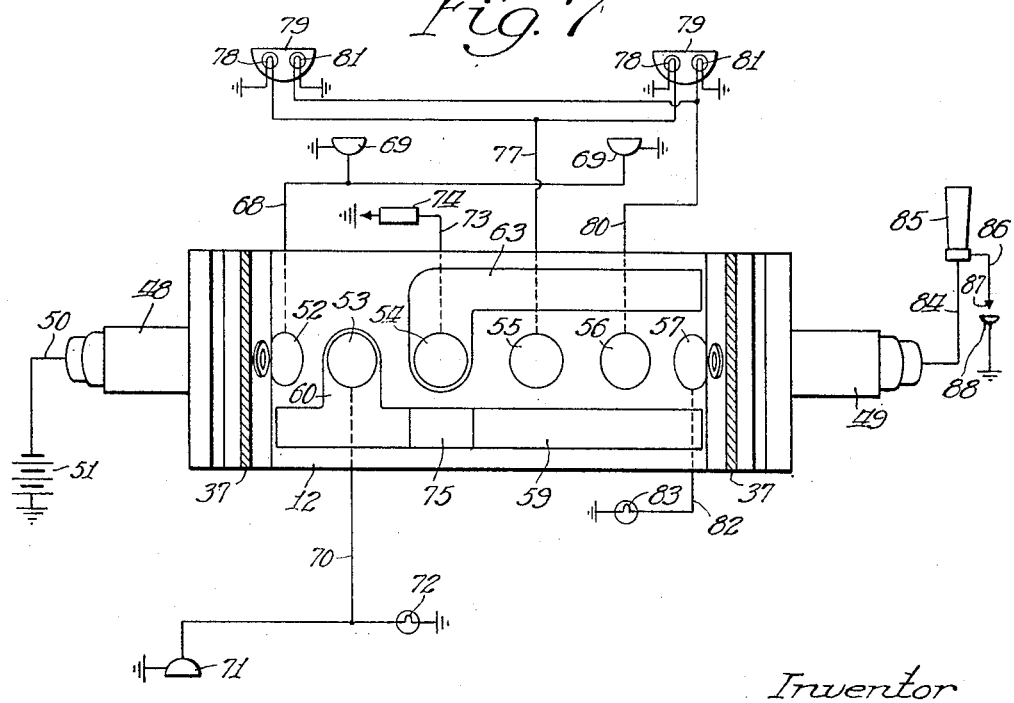
Inventor
Harry A. Douglas
By Langson Mom
Atty Patented Oct. 18, 1932

1,883,625

UNITED STATES PATENT OFFICE

HARRY A. DOUGLAS, OF BRONSON, MICHIGAN

SWITCHING MECHANISM

Application filed February 18, 1932. Serial No. 593,802.

This invention relates to switching mechanism more particularly for automotive vehicles and electrical circuits associated therewith.

The invention is of particular utility in connection with switching mechanism which is mounted upon the instrument panel of the vehicle.

Among other objects, the invention provides a simple and efficient horn connection associated with the type of switching mechanism disclosed.

Another object of the invention is to provide an insulating contact carrier in association with novel means for keying the carrier to an actuating member therefor.

The invention will be more fully explained by reference to the illustrative construction shown in the accompanying drawings in which—

Figure 1 is a front view of an instrument panel with the invention applied thereto;

Figure 2 is a plan view of the structure of Figure 1, the panel being shown in section;

Figure 3 is a section, somewhat enlarged, taken on the line 3—3 of Figure 5;

Figure 4 is a perspective view of the insulating contact carrier and keying means;

Figure 5 is a rear view of the structure of Figure 1 without the instrument panel and with the rear end of the casing removed;

Figure 6 is a view of separated parts of the mechanism; and

Figure 7 is an enlarged section taken on the line 7—7 of Figure 5, showing diagrammatically illustrative circuits associated therewith.

The switching mechanism illustrated is generally enclosed in the conventional cylindrical casing 1 which is appropriately secured to a supporting bracket 2 which may be of oval configuration and be received in a corresponding aperture in the instrument panel 3. The bracket 2 may be covered by a cover plate 4 of similar configuration which forms a frame 5 through which is observable a legend plate, in this instance, the glass plate 6 carrying appropriate legends indicating the respective operating positions of the mechanisms as indicated in Figure 1.

The bracket 2 is desirably provided with integral ears 7 offset from the bracket to conveniently register with bosses 8 appropriately located on the rear of the panel 3 and which threadedly receive screws 9 passing through the ears 7 to secure the bracket and with it the casing 1 to the instrument panel.

The switch casing 1 is desirably formed of two mating cup-shaped sections 10 and 11, these sections having clamped between them a semi-cylindrical insulating wall member 12 which forms a portion of the wall of the casing 1. The member 12 may be secured by having edges of the sections 10 and 11 received in grooves in the edges of the member 12 as best shown at 13, 13 (Figure 3). The sections 10 and 11 may be themselves clamped together by having laterally disposed mating flanges 14 and 15 and segmental ears 16 on one of these flanges, in this instance, the flange 15 crimped over the other flange.

The forward section of the casing 1, in this instance, the section 11 is provided with a circular central aperture which registers with similar apertures in the bracket 2 and glass plate 6. A double flanged sleeve member 17 secured in these apertures forms a bearing for the reduced portion 18 of the hub 19 of the operating lever 20. The lever 20 is directed radially of the hub portions 18 and 19 and is accessible upon the outer or forward face of the instrument panel for hand operation. Between the portions 18 and 19 of the hub is an enlarged circular portion 21 which rides upon the sleeve 17 in the rotation of the lever. The hub portion 18 has diametrically disposed lugs 22 which are snugly received in correspondingly shaped slots 23 of the metallic clip member 24; thus the hub portion 18 and the lugs 22 constitute an actuator for a contact carrier presently described as carried by the clip 24. To secure the clip member and lugs 22 in fixed relation, the clip is here shown having an integral circular boss 25 located between the slots 23 and threaded to receive a screw 26 which passes through the hub portions 18 and 19 and is screwed into the boss 25. The bore of the hub portions 18 and 19 through which the screw 26 passes may be counterbored as at 27 to receive the boss 25.

As here shown, the clip member 24 is bent upon itself to embrace an insulating contact carrier 28 of oblong configuration, the clip lapping three sides of the carrier and having fingers 29 which are bent over the fourth side of the carrier, the clip and carrier being locked against telescoping movement by shoulders 30 on the fourth side of the carrier against which the fingers 29 abut. At its end opposite the boss 25 the clip is provided with a circular continuation 31 which forms a hub journaled in a flanged central aperture 32 in the rear of the casing section 10 and coaxial with the hub 18 of the operating lever. So constructed and arranged, the contact carrier 28 may be rotated within the casing 1 by rotation of the operating lever 20 and the carrier is disposed in a plane extending along the axis of the hub 18 of the operating lever and passing through said axis.

The contact carrier 28 is shown bored in the direction of its greatest width to receive a metallic contact member to be spring pressed radially of the axis of rotation of the carrier. In the illustrative construction, the carrier is provided with a sufficient number of bores, such as the bores 28a, to receive three metallic contact members 33, 34 and 35 (Figure 3) arranged parallel in a plane extending along the axis of rotation of the contact carrier and passing through said axis, said contact members extending in a direction which is perpendicular to the axis and upon diametrically opposite sides. As here shown, each of the contacts 33, 34 and 35 comprises two telescoping tube sections 34a and 34b, for example, closed at their outer ends and together enclosing a coil spring 36 which presses the tube sections apart. The tube sections 34a which are received in the tube sections 34b are obviously of smaller diameter than the sections 34b and to insure assembly of the contacts with the carrier in but one relationship, the bores 28a are of sufficient diameter at one side of the carrier 28 to receive the tube sections 34b, but are of reduced diameter at the other side of the carrier as at 29b to receive only the tube sections 34a. Under the action of the spring 36, the tube sections 34a and 34b are pressed radially apart. One of these tube sections 34a of each contact which is received by the other section is desirably provided at its inner end with spring fingers 34c which may be sprung outwardly slightly to be compressed by the other tube section and thus by friction to maintain the tube sections in assembly. The limit of expansion of the spring 36 is such that it does not force the sections apart beyond contact of the spring fingers 34c with the tube section 34b. Each end of the contacts 33, 34 and 35 engage complementary contacts circumferentially disposed within the casing 1, the movable contacts 33, 34 and 35 thus providing current conducting bridges between the circumferentially disposed fixed contacts.

One of these complementary contacts is desirably produced as an oblong piece of metal which is formed into the somewhat semi-circular plate 37 secured at each end to the insulating wall member 12 and otherwise spaced from the metallic portions of the casing 1. The plate 37 is bent upon itself to produce a plurality of parallel grooves 38, 39, 40, 41, 42 and 43 disposed longitudinally of the axis of rotation of the contact carrier 28. These grooves are desirably V-shape and receive with a snap action the cone-shape terminations 44 of one end of the contacts 33, 34 and 35. One of these grooves, such as the groove 42, is not itself V-shape, but for a purpose presently pointed out, is advantageously filled with a block of insulation 45 in which the V-shape groove 46 is formed corresponding to the V-shape groove of the plate 37. To prevent displacement of the insulating block 45, the groove 42 may have undercut walls and the block 45 may be similarly shaped thus preventing movement of the block outwardly of the groove.

The plate 37 may be secured to the wall member 12 by having metallic terminal members 48 and 49 which pass through the wall member 12 passing also through the plate 37 and being clinched over the plate 37. Thus the plate 37 is mechanically and electrically connected with each of the terminals 48 and 49. An insulated wire 50 connects the terminal 48 with one side of the grounded battery 51, thus also electrically connecting the plate 37 with the battery.

Complementary contacts upon the opposite side of the axis of rotation of the carrier 28 from the plate 37 are here represented by the metallic terminal members 52, 53, 54, 55, 56 and 57 which are secured in the wall member 12 and terminate flush with the inner surface of said member. The plate 37 and the contacts 52 to 57 inclusive are disposed in a plane which is perpendicular to the axis of rotation of the movable contacts 33, 34 and 35 and which passes through the contact 34. The movable contact 34 thus forms a current conducting bridge between the plate 37 and the stationary contacts 52, 54, 55, 56 and 57. The terminal 53, for reasons presently pointed out, is not a contact. The movable contacts 33, 34 and 35 desirably have somewhat dome-shaped ends 58 which ride smoothly over the wall member 11 and engage the terminal members.

A movable contact 33 similarly forms a current conducting bridge between the plate 37 and a contact 59 which may be an arcuate metallic plate imbedded in the wall member 12 to be flush with the wall and extending abreast of and upon one side of the terminal members 52 to 57 inclusive. The plate 59 is laterally extended as at 60 to be mechanically and electrically connected with the terminal member 53 by having a perforation 61 through which the terminal member 53 snugly passes, and is clinched over the extension 60.

The plate 59 may be mechanically secured to the wall member 11 by suitably directed end portions 62 which pass through the wall member and are clinched upon the outer side thereof.

The movable contact 35 provides a current conducting bridge between the plate 37 and another complementary contact here represented by the arcuate plate 63 which is imbedded in the wall member 12 to be flush with the inner surface thereof similarly to the plate 59. The plate 63 has a lateral extension 64 through a perforation 65 of which the terminal 54 snugly passes and is clinched over the extension 64, thus mechanically and electrically connecting the plate 63 and the terminal 64. The plate 63 also has a suitably directed portion 66 which passes through the wall member 12 similarly to the portions 62 of the plate 59. The extensions 62 of the plate 59 and the extension 66 of the plate 63 are clinched upon the outer surface of the wall member 12 as by the portions 67 of the plates. The coil springs 34, as will now be readily understood, enclosed within the movable contacts 33, 34 and 35 maintain the tube sections of these contacts pressed apart and into engagement with the aforementioned complementary contacts.

When the contact carrier is in the position shown in Figure 5, the cone-shaped ends 44 of the movable contacts 33, 34 and 35 are seated in the V-shaped groove 46 of the insulating block 45 which occupies the groove 42 in the plate 37. Consequently, the movable contacts 33, 34 and 35 are insulated from the plate 37 and the current from the battery through the movable contacts is discontinued. This, consequently, constitutes the "off" position of the switch.

When, however, the carrier 28 is rotated by means of the operating lever 20 to cause the movable contacts 33, 34 and 35 to have their cone-shaped ends located in the groove 43 of the plate 37 a circuit is established through the grounded battery 51, conductor 50, terminal 48, plate 37, movable contact 34, terminal 52, which is diametrically opposite the groove 43, insulated wire 68 and through the grounded filament (not shown) of the parking lamps 69. At the same time a circuit is established through the grounded battery 51, plate 37, movable contact 33, arcuate plate 59, terminal 53, insulated wire 70 and through the grounded filament (not shown) of the rear lamp 71 and the grounded filament 72 of an instrument lamp, for example. The dome-shaped end 58 of the contact 35 in this position of the switch engages merely the insulating wall 12 and thus no circuit is established therethrough. This constitutes one position of the switch for night use when the vehicle is not in motion.

When the carrier 28 is rotated to have the cone-shaped ends of the movable contacts seated in the groove 41 of the plate 37 a circuit is established through the grounded battery 51, plate 37, movable contact 34, terminal 54 and insulated wire 73 to the ignition system of the vehicle here symbolically indicated at 74. In this position of the carrier, the contact 33 engages an insulating insert 75 in a depressed portion 76 of the plate 59 and thus no current passes to the rear lamp 71 and instrument lamp 72. In this position of the switch also the contact 35 engages the arcuate plate 63 which is a continuation of the terminal 54 and thus the current which passes through the contact 35 also passes to the ignition system 74. This constitutes the position of the switch suitable for day time driving.

When the contact carrier 28 is rotated to have the cone-shaped ends of the contacts 33, 34 and 35 seated in the V-shaped groove 40 of the plate 37, a circuit is established through the grounded battery 51, plate 37, movable contact 34, terminal 55, insulated wire 77 and through the grounded filaments 78 of the head lamps 79. The filaments 78 may constitute the bright driving lights of the lamps 79 as by being located in the focus of the lamps. At the same time another circuit is established through the grounded battery 51, plate 37, movable contact 33, plate 59, terminal 53, wire 70 and through the grounded rear lamp 71 and instrument lamp 72. Also still another circuit is established through the plate 37, movable contact 35, plate 63, terminal 54 and through the ignition system 74. Thus this constitutes the position of the switch for normal night driving.

When the carrier 28 is rotated to have the cone-shaped terminations of the movable contacts seated in the groove 39 of the plate 37 a circuit is established through the grounded battery 51, plate 37, movable contact 34, terminal 56, insulated wire 80 and through the grounded filaments 81 of the head lamps 79. The filaments 81 may constitute the intermediate driving lights of the vehicle as by being located above the focus of the lamp 79. At the same time another circuit is established through the plate 37, movable contact 33, plate 59, terminal 53, wire 70 and through the rear lamp 71 and instrument lamp 72. Also still another circuit is established through the plate 37, movable contact 35, plate 63, terminal 54 and through the wire 73 to the ignition system 74. This constitutes the position of the switch for night driving when the vehicle is passing another car, for example.

When the carrier is still further rotated to have the cone-shaped ends of the movable contacts seated in the groove 38 of the plate 37 a circuit is established through the grounded battery 51, plate 37, metallic plate 34, terminal 57 through the insulated wire 82 to the grounded filament of the reading lamp 83, for example. At the same time still another circuit is established through the plate 37, contact 33, plate 59, terminal 53, wire 70 and through the rear lamp 71 and instrument lamp 72. Also a circuit is established through the plate 37, contact 35, plate 63, terminal 54, wire 73 and through the ignition system 74. This constitutes a selective position of the switch in which the parking and driving lights are extinguished. An insulated wire 84 connects the terminal 49 with the conventional electromagnetic horn 85 and another insulated wire 86 leads from the horn to a contact button 87 which may be located for example on the steering column of the vehicle (not shown). By means of a movable contact 88 the horn may be grounded upon which a circuit is established through the grounded battery 51, wire 50, terminal 48, plate 37, terminal 49, wire 84 and through the horn 85 to energize the latter. So constructed and arranged the horn may be energized in any position of the switching mechanism which is inclusive of the contact carrier 28.

The wires shown may conveniently terminate in conventional bulbous shaped plugs 89 which are received in cylindrical openings 90 of the terminal members and in accordance with conventional practice are retained therein by spring pressed detents 91 which engage the bulbous plugs 89.

Complete rotation of the contact carrier 28 is desirably prevented by a stop 92 struck inwardly from the casing section 11 and which is engaged by the carrier 28.

Obviously, the invention is not limited to the specific details of construction herein described for purposes of exemplification. Furthermore, it is not indispensable that all features of the invention be used conjointly as various combinations and sub-combinations may be advantageously employed.

Having described an embodiment of my invention, I claim:

1. In a switching mechanism the combination of a casing, an insulating contact carrier rotatable in said casing, a metallic clip gripping said carrier, said clip being journaled at one end in the casing and keyed at the other end to an actuator, said actuator being journaled in the casing and having an operating lever extending outside of the casing, and means for securing the actuator to the clip.

2. The structure of claim 1 wherein the contact carrier is of substantially oblong shape and the clip laps three sides of the carrier and has fingers which are clinched upon the fourth side.

3. The structure of claim 1 wherein the contact carrier is of substantially oblong shape and the clip laps three sides of the carrier and has fingers which are clinched upon the fourth side, and wherein the fingers engage shoulders on the carrier to prevent movement of the clip with respect to the carrier.

4. The structure of claim 1 wherein the clip has a threaded boss received in the actuator and wherein the actuator hub is bored to receive a screw which engages the threads of the boss to maintain the actuator and clip in assembly.

5. The structure of claim 1 wherein the actuator has diametrically disposed lugs and the clip has similarly shaped slots which receive the lugs of the actuator for keying the clip to the actuator.

6. The structure of claim 1 wherein the clip has a threaded boss received in the actuator, wherein the actuator hub is bored to receive a screw which engages the threads of the boss to maintain the actuator and clip in assembly, and wherein the actuator has diametrically disposed lugs and the clip has similarly shaped slots which receive the lugs of the actuator for keying the clip to the actuator.

7. In a switching mechanism the combination of a rotatable contact carrier, radially spring pressed contacts carried by said carrier and a circumferentially disposed plate constituting a complementary contact for said spring pressed contacts, said plate having corrugations extending in the direction of the axis of rotation of the carrier and the contacts carried by the carrier having cone-shaped ends which are received by a snap action in said corrugations.

8. The structure of claim 7 wherein the contact carrier is bored to slidingly receive the spring pressed contacts and wherein these contacts are formed of mating tube sections which enclose a coil spring pressing the tube sections apart on diametrically opposite sides of the contact carrier.

9. The structure of claim 7 wherein the contact carrier is bored to slidingly receive the spring pressed contacts, wherein these contacts are formed of mating tube sections which enclose a coil spring pressing the tube sections apart on diametrically opposite sides of the contact carrier, and wherein the bores of the contact carrier are of a diameter at one end to receive the larger of the two mating tube sections and at the other end to receive the smaller of the two mating tube sections, whereby the contacts may be assembled with the carrier in but one relationship.

In witness whereof, I hereunto subscribe my name.

HARRY A. DOUGLAS.